United States Patent
Oku et al.

(10) Patent No.: US 6,773,472 B2
(45) Date of Patent: Aug. 10, 2004

(54) GAS REFORMER FOR RECOVERY OF HYDROGEN

(75) Inventors: Manabu Oku, Shin-Nanyo (JP);
Kouichi Kawatani, Tokyo (JP);
Takeshi Utsunomiya, Tokyo (JP);
Tsutomu Seki, Tokyo (JP)

(73) Assignees: Nisshin Steel Co., Ltd., Tokyo (JP);
Tokyo Gas Co., Ltd., Tokyo (JP)

( * ) Notice: Subject to any disclaimer, the term of this patent is extended or adjusted under 35 U.S.C. 154(b) by 605 days.

(21) Appl. No.: 09/891,109

(22) Filed: Jun. 25, 2001

(65) Prior Publication Data

US 2002/0029521 A1 Mar. 14, 2002

(30) Foreign Application Priority Data

Jun. 27, 2000 (JP) ........................................ 2000-192046
Jun. 27, 2000 (JP) ........................................ 2000-192047

(51) Int. Cl.$^7$ ................................................ B01J 7/00
(52) U.S. Cl. ........................................................ 48/61
(58) Field of Search ............................ 48/61, 62 R, 89,
48/119, 127.9, 128, 198.2, 198.7; 422/188–191,
193, 198, 211, 222, 236; 55/524, 16.5;
95/44, 55, 56; 96/4, 7, 10, 11

(56) References Cited

U.S. PATENT DOCUMENTS 5,458,857 A * 10/1995 Collins et al. .............. 422/198
6,527,832 B2 * 3/2003 Oku et al. ........................ 96/4

FOREIGN PATENT DOCUMENTS

JP 63294925 12/1988
JP 01164419 6/1989

* cited by examiner

Primary Examiner—Samuel M. Heinrich
(74) Attorney, Agent, or Firm—Webb Ziesenheim Logsdon Orkin & Hanson, P.C.

(57) ABSTRACT

A ferritic stainless steel sheet containing 16–25 mass % of Cr and Ti and/or Nb at a ratio of (C+N)×8 or more is used as a substrate for formation of a hydrogen-permeating membrane exposed to a high-temperature atmosphere of 600–900° C., while another ferritic stainless steel sheet containing Cr up to 15 mass % is used as a substrate for formation of a hydrogen-permeating membrane exposed to a high-temperature atmosphere of 450–600° C. The stainless steel sheet is formed to a perforated body 3a with holes for passage of gas. A hydrogen-permeating membrane 3b is fixed to on an external surface of the perforated body 3a to build up a hydrogen-separating pipe 3. A plurality of the hydrogen-separators 3 are inserted into a cavity between inner and outer walls of a double-pipe 2 filled with a catalyst 4. Hydrocarbon gas fed through a nozzle 7 is decomposed with combustion heat of a fuel F fed into an inner space of the double-pipe 2. A decomposition product $H_2$ selectively permeates through the membrane 3b and flows out through the takeout opening 8.

2 Claims, 1 Drawing Sheet

GAS REFORMER FOR RECOVERY OF HYDROGEN

BACKGROUND OF THE INVENTION

The present invention relates to a gas reformer for recovering hydrogen gas generated by thermal decomposition of hydrocarbon gas.

Hydrogen has been used in broad industrial fields, as basic raw material in a chemical industry, a fuel for a fuel cell or atmospheric gas for heat treatment. A representative process to cope with a small demand is reformation of hydrocarbon with steam. Since a product obtained by the reforming process contains CO, $CO_2$ and residual $H_2O$ other than $H_2$, it cannot be used as such for a fuel cell due to the inclusions; otherwise performance of the fuel cell would be worsened. In this regard, removal of subspecies such as CO, $CO_2$ and residual $H_2O$ from $H_2$ is necessitated, before the reformed product is supplied to a fuel cell A conventional method of removing subspecies uses a hydrogen-permeating membrane made of a catalytic element such as Pd—Ag or Ta, which enables selective permeation of hydrogen The hydrogen-permeating membrane has been formed so far as a thin layer on a heal-resistant porous body, as disclosed in JP 63-294925 A1 and JP 1-164419 A1. Recently, feasibility of a metal body, which is perforated with holes for passage of hydrogen has been studied instead of a conventional heat-resistant porous body.

In a conventional method using a hydrogen-permeating membrane, a double-pipe 2 is located in a jacket 1, a plurality of hydrogen-separating pipes 3 each composed of a perforated body 3a and a hydrogen-permeating membrane 3b are inserted between inner and outer walls of the double-pipe 2, and a cavity of the double-pipe 2 is filled with a catalyst 4. A box-shape hydrogen-separator, which has an external surface coated with a hydrogen-permeating membrane 3b, may be used instead of the hydrogen-separating pipe 3. The catalyst may be Ni or the like supported by alumina or the like.

A fuel F is fed together with air A through a burner 5 and a burner tile 6 into an inner space of the double-pipe 2, and burnt therein. Hydrocarbon gas G to be reformed is blown together with steam through a nozzle 7 into a cavity between inner and outer walls of the double-pipe 2, and decomposed to $H_2$ and $CO_2$ according to a reforming reaction of $CH_4 + 2H_2O = 4H_2 + CO_2$ for instance.

A reaction product $H_2$ selectively permeates through the membrane 3b into the hydrogen-separator 3, and flows out through a takeout pipe 8. Selective permeation of hydrogen $H_2$ from a reacting zone through the hydrogen-permeating membrane 3b accelerates the reforming reaction of $CH_4 + 2H_2O = 4H_2 + CO_2$. A by-product $CO_2$ is discharged as waste gas W together with excessive $H_2O$ and combustion gas through an exhaust pipe 9 to the outside.

The reforming reaction of $CH_4 + 2H_2O = 4H_2 + CO_2$ is accelerated at a temperature above 690° C., and the reaction rate quickens as increase of the temperature. Another reaction of $CO + H_2O = CO_2 + H_2$ is exothermic on the contrary, and the reaction does not advance over 707° C. In order to efficiently promote these reactions, the double-pipe 2 is conventionally heated with combustion heat of a fuel F in the manner such that an inner space of the double-pipe 2 is held at a temperature in a range of about 600–900° C. with a proper temperature gradient.

Heat-resistant stainless steel is representative material for high-temperature use, but an atmosphere in the gas reformer contains steam for reformation of hydrocarbon. Such the wet atmosphere causes oxidation and intergranular corrosion of a perforated body made of a conventional heat-resistant stainless steel such as SUS410L, SUS430 or SUS304. As a result, the hydrogen-permeating membrane 3b is peeled off or cracked, and $H_2$ gas flowing through the takeout pipe 8 reduces its purity due to inclusion of $C_2H_{2n+2}$, $H_2O$ and $CO_2$.

Due to selective separation of $H_2$ from the reacting zone through the hydrogen-permeating membrane 3b, equilibrium in the reaction of $CH_4 + 2H_2O = 4H_2 + CO_2$ collapses, and the reaction progresses to the rightward. Consequently a temperature necessary for the reforming reaction can be lowered to 450–600° C. However, the reacting atmosphere is still at a high temperature. When the reformer is operated at such a high-temperature atmosphere over a long term, the hydrogen-separator 3 is significantly damaged due to peel-off of the hydrogen-permeating membrane 3b as well as occurrence of cracks. Damage of the hydrogen-separating pipe 3 means inclusion of $C_2H_{2n+2}$, $H_2O$ and $CO_2$ in $H_2$ flowing through the takeout opening 8, resulting in degradation of an objective gas $H_2$.

SUMMARY OF THE INVENTION

The present invention aims at provision of a gas reformer which can be driven with higher performance even in case of long-term driving at a high-temperature atmosphere by use of a perforated body made of a ferritic stainless steel containing Cr at a proper ratio in response to a driving temperature.

A new gas reformer proposed by the present invention involves a plurality of hydrogen-separators each having a substrate, which is made of a ferritic stainless steel perforated with holes for passage of $H_2$ gas and coated with a hydrogen-permeating membrane at its external surface. The hydrogen-separators are inserted into inner and outer walls of a double-pipe filled with a catalyst. Hydrocarbon gas is decomposed with combustion heat of a fuel fed into an inner space of the double-pipe, and a decomposition product $H_2$ permeates through the hydrogen-permeating membrane and then flows to the outside.

The ferritic stainless steel, which is used as the substrate for formation of the hydrogen-permeating membrane of the hydrogen-separator to be exposed to an atmosphere of 600–900° C., contains 16–25 mass % Cr and Ti and/or Nb at a ratio of (C+N)×8 or more. Ti and/or Nb concentrations are preferably controlled in ranges of 0.1–0.7 mass % Ti and 0.2–0.8 mass % Nb, respectively, under the condition of (Ti, Nb)≧(C+N)×8. The ferritic stainless steel may contain at least one or more of Y and lanthanoids at a ratio up to 0.1 mass % for improvement of oxide resistance, and further contain one or more of Si Mn, AL Mo, Cu, V, W and Ta at a proper ratio for improvement of heat resistance.

The ferritic stainless steel, which is used as the substrate for formation of the hydrogen-permeating membrane of the hydrogen-separator to be exposed to an atmosphere of 450–600° C., contains Cr up to 15 mass % and Ti and/or Nb at a ratio of (C+N)×8 or more. Ti and/or Nb concentrations are preferably controlled in ranges of 0.1–0.7 mass % Ti and 0.2–0.8 mass % Nb, respectively, under the condition of (Ti, Nb)≧(C+N)×8.

DETAILED DESCRIPTION OF THE PREFERRED EMBODIMENTS

Figure 1:
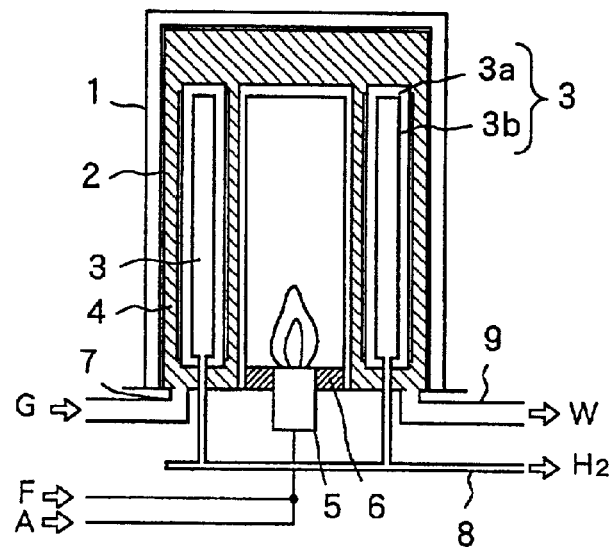
FIG. 1 is a schematic view illustrating an inner structure of a gas reformer.

An atmosphere of a gas reformer driven at a high temperature of 600–900° C. contains steam for reformation of hydrocarbon gas G. Although a conventional heat-resistant steel is good of heat and corrosion resistance due to a passive film formed thereon, the passive film is gradually reduced in a state exposed to a high-temperature atmosphere containing steam and hydrogen $H_2$ as a decomposition product. Degradation of the passive film promotes oxidation with steam and intergranular corrosion. Consequently, adhesiveness of the hydrogen-permeating membrane 3b to the perforated body 3a is weakened, and the membrane 3b is easily peeled off or cracked. Occurrence of such the defects means degradation of faculty of the hydrogen-permeating membrane 3b as a permselective membrane.

The inventors have researched and examined oxidation and intergranular corrosion of a hydrogen-separator 3 exposed to a high-temperature wet atmosphere of 600–900° C., and discovered that a ferritic stainless steel containing 16–25 mass % Cr is optimum material for a perforated metal body 3a.

A ferritic stainless steel containing 16 mass % or more of Cr exhibits excellent oxidation resistance in a state coated with Cr-rich scales (composed of $Cr_2O_3$ or spinel) generated in an ordinary atmosphere. The Cr-rich scales are more stabilized as increase of Cr content, so that the stainless steel can be used at a much higher temperature. On the other hand, an atmosphere of a gas reformer contains a huge amount of steam, which causes generation of bilayered scales composed of $Fe_3O_4$ (as an external layer) and Fe—Cr spinel (as an inner layer) on a surface of the stainless steel.

Such the bilayered scales accelerate oxidation of the stainless steel compared with oxidation in the open air. In this regard, Cr content is determined at a value of 16 mass % or more, to stabilize the Cr-rich scales and to inhibit generation of the bilayered scales in the wet atmosphere. Oxidation resistance in the wet atmosphere is also improved by addition of Al, Si and so on.

Intergranular corrosion is the phenomenon that corrosion progresses along a Cr-poor phase, which is caused by reaction of Cr dissolved in matrix with C to generate chromium carbide, at grain boundaries. Such intergranular corrosion is inhibited by addition of Ti and/or Nb to fix C as carbides and carbonitrides. An effect of Ti and/or Nb on inhibition of intergranular corrosion is apparently noted by addition of Ti and/or Nb at a ratio of (C+N)×8 or more. The additive Nb also improves high-temperature strength of the stainless steel and suppresses deformation of the stainless steel caused by thermal hysteresis between an ordinary temperature and a high temperature. In this regards, Ti and/or Nb contents are preferably determined at 0.1–0.7 mass % Ti and 0.2–0.8 mass % Nb, respectively.

A ratio of Ti and/or Nb necessary for fixing C and N may be reduced by lowering C and N less than 0.02 mass %. Reduction of C and N contents also improves workability of the ferritic stainless steel, so as to easily perforate the stainless steel with holes for passage of hydrogen.

The ferritic stainless steel may further contain at least one of Y, La and other rare earth elements for improvement of strength, creep property and oxidation resistance at a high-temperature. An effect of the rare earth elements is apparently noted at a ratio of 0.01 mass % or more, but saturated at 0.1 mass %. Other additives such as Mo, Cu, V, W and Ta may be added at a proper ratio for improvement of high-temperature strength, and still other additives such as Si, Al and Mn may be added at a proper ratio for improvement of oxidation resistance at a high temperature.

The ferritic stainless steel containing 16–25 mass % Cr also has the advantage that its thermal expansion coefficient is similar to that of the hydrogen-permeating membrane 3b. For instance, a ferritic stainless steel containing 18 mass % Cr has a thermal expansion coefficient of about $12 \times 10^6/°$ C., while a Pd—Ag alloy has a thermal expansion coefficient of about $14 \times 10^6/°$ C. in a temperature range of 20–700° C. Since the thermal expansion coefficients are nearly the same, no thermal stress occurs even after the hydrogen-separator 3 is repeatedly subjected to heat cycles between an ordinary temperature and a high temperature. Consequently, cracking hardly occurs in the hydrogen-permeating membrane 3b.

As above-mentioned, the perforated body 3a, which is made of a ferritic stainless steel containing 16–25 mass % of Cr, as a substrate for formation of the hydrogen-permeating membrane 3b keeps sufficient strength without occurrence of oxidation or intergranular corrosion in a high-temperature wet atmosphere of 800° C. or so. As a result, the new gas reformer can be continuously driven over a long term.

A gas reformer may be driven at a relatively lower temperature of 450–600° C., since selective separation of hydrogen from a reacting zone accelerates the reforming reaction of $CH_4+2H_2O=4H_2+CO_2$ to the rightwards. The lower temperature-driving eases characteristics of a stainless steel necessary for a substrate for formation of a hydrogen-permeating membrane. However, when a perforated body 3a made of a conventional heat-resistant stainless steel is exposed to such the wet atmosphere over a long term, the stainless steel is easily damaged due to 475° C.-embrittlement and intergranular corrosion. As a result, the perforated body 3a is also deformed regardless of the lowered temperature, and the hydrogen-permeating membrane 3b degrades its faculty.

According to the inventors' researches on occurrence of 475° C.-embrittlement and intergranular corrosion, it is recognized that a ferritic stainless steel containing Cr up to 15 mass % is optimum material as the perforated body 3a of a hydrogen-separator exposed to a high-temperature atmosphere of 450–600° C.

A phenomenon of 475° C.-embrittlement caused by separation of a steel matrix to a Cr-enriched phase and a Cr-poor phase, when a stainless steel is heated at a high temperature. Occurrence of such the phenomenon is promoted as increase of Cr content. On the other hand, a ferritic stainless steel containing Cr at a ratio controlled to 15 mass % or less does not allows supplement of Cr required for generation of the Cr-enriched phase, so as to inhibit 475° C.-embrittlement.

Intergranular corrosion is the phenomenon which is the same as in a case of the ferritic stainless steel containing 16–25 mass % of Cr. Addition of Ti and/or Nb at a ratio of (C+N)×8 or more is also effective for inhibition of intergranular corrosion. The additive Nb also improves high-temperature strength of the stainless steel and suppresses deformation of the stainless steel caused by thermal hysteresis between an ordinary temperature and a high temperature. In this regards, Ti and/or Nb contents are preferably determined at 0.1–0.7 mass % Ti and 0.2–0.8 mass % Nb, respectively.

Ti and/or Nb contents necessary for fixing C and N may be reduced by lowering C and N less than 0.02 mass %. Reduction of C and N contents also improves workability of the ferritic stainless steel. The ferritic stainless steel may further contain at least one of Si, Al, Mn, Mo, Cu, V, W and Ta at a proper ratio for improvement of heat-resistance other than Cr, Ti and Nb.

The ferritic stainless steel containing Cr up to 15 mass % also has the advantage that its thermal expansion coefficient of about $12 \times 10^{-6}/°C$ is near that of the hydrogen-permeating membrane 3b in a temperature range of 20–700° C. Due to the similarity of the thermal expansion coefficients, no thermal stress occurs even after the hydrogen-separating pipe 3 is repeatedly subjected to heat cycles between an ordinary temperature and a high temperature. Consequently cracking hardly occurs in the hydrogen-permeating membrane 3b.

As above-mentioned, the perforated metal body 3a, which is made of a ferritic stainless steel containing Cr up to 15 mass %, as a substrate for formation of the hydrogen-permeating membrane 3b keeps sufficient strength without occurrence of 475° C.-embrittlement in a high-temperature wet atmosphere of 450–600° C.

The gas newly proposed by the present invention as above-mentioned uses a ferritic stainless steel as material of the perforated body 3a for formation of the hydrogen-permeating membrane 3b. Cr content of the stainless steel is determined at 16–25 mass % for a hydrogen-separator exposed at a high-temperature wet atmosphere of 600–900° C., to inhibit high-temperature oxidation and intergranular corrosion. For a hydrogen-separator exposed at a high-temperature wet atmosphere of 450–600° C., Cr content of the stainless steel is determined at a ratio up to 15 mass %, in order to inhibit 475° C.-embrittlement and intergranular corrosion.

Due to the control of Cr content, the hydrogen-separator sufficiently endures to a high-temperature atmosphere over a long term. The stainless steel also has the advantage that its thermal expansion coefficient is near that of the hydrogen-permeating membrane, so that the membrane is hardly peeled off or cracked due to thermal stress caused by heat cycles. Consequently, the proposed gas reformer can be driven with high performance over a long term, to produce hydrogen useful in various industrial fields.

EXAMPLE 1

Each stainless steel sheet of 2.0 mm in thickness having composition shown in Table 1 was held 50 hours in a high-temperature atmosphere, which simulated an atmosphere of a gas reformer, of 700° C. with a partial vapor pressure of 0.02 MPa to testify oxidation resistance at a high temperature. Oxidation resistance was evaluated by weight gain after the high-temperature holding.

For evaluation of intergranular corrosion, a test piece was TIG-welded, heated 10 hours at 500° C., immersed in a corrosive liquid of sulfuric acid/cupric sulphate and then bent with 2t. Resistance to intergranular corrosion was evaluated by presence or absence of crackings at the bent part.

TABLE 1

FERRITIC STAINLESS STEELS USED IN EXAMPLE 1

| Steel kind | | Cr | C | N | Si | Mn | Nb | Ti | Mo | Cu | Y |
|---|---|---|---|---|---|---|---|---|---|---|---|
| Inventive | 1 | 17.2 | 0.01 | 0.02 | 0.23 | 0.20 | 0.49 | — | — | — | — |
| Examples | 2 | 16.5 | 0.02 | 0.01 | 0.39 | 0.28 | — | 0.27 | — | — | — |
| | 3 | 22.1 | 0.01 | 0.02 | 0.18 | 0.20 | 0.23 | 0.19 | 0.18 | — | — |
| | 4 | 18.1 | 0.01 | 0.01 | 0.32 | 0.96 | 0.44 | — | 1.95 | 0.21 | — |
| | 5 | 16.3 | 0.02 | 0.01 | 0.56 | 0.21 | — | 0.31 | — | — | 0.03 |
| Comparative | 6 | 16.2 | 0.06 | 0.03 | 0.59 | 0.28 | — | — | — | — | — |
| Examples | 7 | 12.01 | 0.02 | 0.01 | 0.53 | 0.11 | — | — | — | — | — |

Test results are shown in Table 2. It is noted from Table 2 that any of Inventive Examples Nos. 1–5 did scarcely change its weight after the heating without occurrence of intergranular corrosion. On the other hand, intergranular corrosion was detected in any of Comparative Examples Nos. 6 and 7. Especially, signicant steam oxidation was detected in any of Comparative Example No. 7 due to lack of Cr.

These results prove that addition of Cr at a ratio of 16 mass % or more and stabilization of C and N with Ti and/or Nb are necessary to bestow a ferritic stainless steel with properties required as a substrate 3a for formation of a hydrogen-permeating membrane 3b exposed to a high-temperature wet atmosphere of 600–900°C.

TABLE 2

EFFECTS OF HIGH-TEMPERATURE HOLDING ON PROPERTIES OF STAINLESS STEELS

| Steel Kind | | weight gain due to oxidation (mg) | intergranular corrosion (occurrence of cracking after 2t-bending) |
|---|---|---|---|
| Inventive | 1 | 0.5 | no |
| Examples | 2 | 0.6 | no |
| | 3 | 0.2 | no |
| | 4 | 0.3 | no |
| | 5 | 0.3 | no |
| Comparative | 6 | 0.7 | yes |
| Examples | 7 | 2.5 | yes |

Figure 2A:
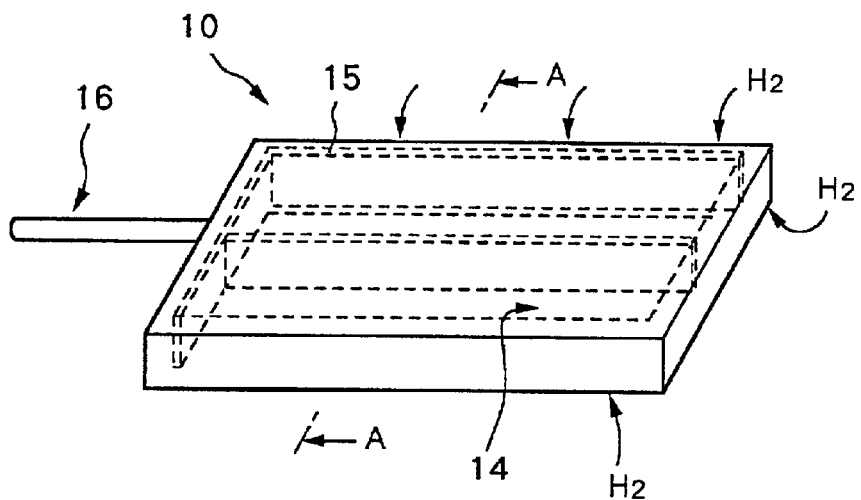
FIG. 2A is a bird eye's view illustrating a box-shape hydrogen separator used in Example.
Figure 2B:
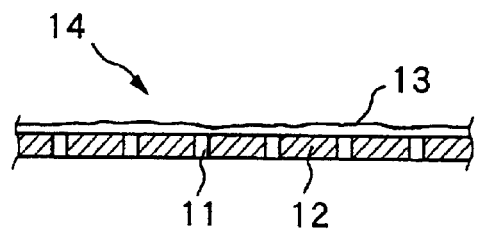
FIG. 2B is a view illustrating a cross-section of a hydrogen-separator cut along the line A—A in FIG. 2A

A steel sheet of Inventive example 2 was formed to a perforated body 12 having many holes 11 for passage of gas with pitches of 0.2 mm, as shown in FIG. 2B. A Pd-23 mass % Ag layer of 20 μm in thickness was fixed as a hydrogen-permeating membrane 13 to the perforated body 12, to build up a hydrogen-separator 14. The hydrogen-separator 14 was attached to both surfaces of a box-shape frame 15 (shown in FIG. 2A), and a takeout pipe 16 for recovery of hydrogen was attached to a side of the box-shape frame 15. A hydrogen-recovering device 10 constructed in this way had a surface area of 100 cm². The device 10 may be a tubular shape (such as a hydrogen-separating pipe 3 shown in FIG. 1) instead of the box-shape.

The hydrogen-recovering device 10 was installed in a double-pipe 2 (shown in FIG. 1), to research hydrogenpermeability and endurance. For the faculty test, methane was fed together with steam through a nozzle 7 to a cavity between inner and outer walls of the double-pipe 2, and heated at 800° C. with combustion heat of a fuel F fed into an inner space of the double-pipe 2. A pressure difference between the cavity of the double-pipe 2 and the takeout pipe 16 was held at 0.8 Pa. Hydrogen generated by decomposition of hydrocarbon gas G flew out through the takeout pipe 16 at a flow ratio of 0.2Nm³/hour.

After the gas reformer was driven 1000 hours, a hydrogen-recovering device 10 was detached from the double-pipe 2 to examine the status of the perforated body 12 and the hydrogen-permeating membrane 13. No defects were observed on the hydrogen-recovering device 10, in comparison to a new device 10. Inclusion of $CH_4$, $H_2O$ and $CO_2$ in $H_2$ gas flowing out through the takeout pipe 16 was controlled at a value less than 1 ppm. Consequently, the product $H_2$ was used as a fuel for a fuel cell without any troubles such as toxification.

For comparison, a hydrogen-recovering device 10 using a perforated body 12 made of the stainless steel of Comparative Example was driven 1000 hours. Significant inclusion of $CH_4$, $H_2O$ and $CO_2$ in $H_2$ gas flowing out through the takeout pipe 16 was detected at a time period after 1000 hours-driving. When the hydrogen-recovering device 10 detached from the double-pipe 2 was observed, the perforated body 12 was heavily deformed, and the hydrogen-permeating membrane 13 fixed to the perforated body 12 was cracked.

It is recognized from the above-mentioned comparison that the hydrogen-recovering device according to the present invention can be driven over a long term.

EXAMPLE 2

Each stainless steel sheet of 2.0 mm in thickness having composition shown in Table 3 were testified for researches of 475° C.-embrittlement and intergranular corrosion. 475° C.-embrittlement was evaluated as a Charpy impact value of each steel sheet after being held at 475° C. for 1000 hours. Resistance to intergranular corrosion was evaluated by the same way as Example 1.

TABLE 3

FERRITIS STAINLESS STEEL SHEETS USED IN EXAMPLE

| Steel Kind | | Cr | C | N | Si | Mn | Nb | Ti |
|---|---|---|---|---|---|---|---|---|
| Inventive | 8 | 12.02 | 0.01 | 0.01 | 0.43 | 0.71 | 0.55 | — |
| Examples | 9 | 11.08 | 0.01 | 0.01 | 0.45 | 0.25 | — | 0.32 |
| | 10 | 14.00 | 0.01 | 0.01 | 0.95 | 1.03 | 0.45 | 0.08 |
| Comparative Example | 11 | 16.20 | 0.06 | 0.03 | 0.59 | 0.28 | — | — | alloying elements and contents (mass %)

Results are shown in Table 4. It is apparent in Table 4 that any steel sheet of Inventive Example Nos. 8–10 did not reduced its toughness even after the heat-treatment. Its resistance to intergranular corrosion was also excellent without occurrence of cracking in a test piece, which had been immersed in a corrosive liquid and then bent.

On the contrary, the stainless steel of Comparative Example No. 11 containing Cr above 15 mass % significantly reduced its toughness after being held at the high temperature. Cracks were also detected at a bent part of the test piece. These disadvantages means that the stainless steel of Comparative Example No. 11 does not satisfies properties of a substrate necessary for formation of a hydrogen-permeating membrane 3b.

TABLE 4

EFFECTS OF HIGH-TEMPERATURE HOLDING ON PROPERTIES OF STAINLESS STEEL SHEETS a Charpy impact value (J/cm²)

| Steel Kind | | before high-temperature holding | after high-temperature holding | intergranular cracking (occurrence of cracks after 2t-bending test) |
|---|---|---|---|---|
| Inventive | 8 | 165 | 151 | no |
| Examples | 9 | 153 | 143 | no |
| | 10 | 126 | 112 | no |
| Comparative Example | 11 | 148 | 43 | Yes |

A steel sheet of Inventive Example No. 9 was formed to the same perforated body 12 as in Example 1, and coated with a Pd-23 mass % Ag layer of 20 μm in thickness, to build up a hydrogen-separator 14. The hydrogen-separator 14 was testified under the same conditions as in Example 1, except for heating the double-pipe 2 at 550° C.

Hydrogen generated by decomposition of hydrocarbon gas G flew out through the takeout pipe 16 at a flow ratio of 0.2Nm³/hour. After the gas reformer was driven 1000 hours, a hydrogen-recovering device 10 was detached from the double-pipe 2 to examine the status of the perforated body 12 and the hydrogen-permeating membrane 13. No defects were observed on the hydrogen-recovering device 10, in comparison to a new device 10. Inclusion of $CH_4$, $H_2O$ and $CO_2$ in $H_2$ gas flowing through the takeout pipe 16 was controlled at a value less than 1 ppm. Consequently, the product $H_2$ was used as a fuel for a fuel cell without any troubles such as toxification.

For comparison, a hydrogen-recovering device 10 using a perforated body 12 made of the stainless steel of Comparative Example No. 11 was driven 1000 hours. Significant inclusion of $CH_4$, $H_2O$ and $CO_2$ in $H_2$ gas flowing through the takeout pipe 16 was detected at a time period after 1000-hours-driving. When the hydrogen-recovering device 10 detached from the double-pipe 2 was observed, the perforated body 12 was heavily deformed, and the hydrogen-permeating membrane 13 fixed to the perforated body 12 was cracked.

It is recognized from the above-mentioned comparison that the hydrogen-recovering device according to the present invention can be driven over a long term.

What is claimed is:

1. A gas reformer, which is driven at a temperature of 600–900° C. for recovery of hydrogen from hydrocarbon, comprising:
   a plurality of hydrogen-separating members each having a substrate, which is made of a ferritic stainless steel containing 16–25 mass % Cr, Ti and/or Nb at a ratio not less than (C+N)×8 and optionally one or more of rare earth metals up to 0.1 mass %, and perforated with a plurality of holes for passage of gas, coated with a hydrogen-permeating membrane at its external surface;
   a double-pipe having inner and outer walls, between which said hydrogen-separating members are inserted; and
   a catalyst for decomposition of hydrocarbon gas put in a cavity defined by said inner and outer walls of said double-pipe,
   wherein hydrocarbon gas is decomposed with a combustion heat of a fuel fed to an inner space of said double-pipe, and hydrogen gas as a decomposition product selectively passes through said hydrogen-permeating membranes to an outside.

2. A gas reformer, which is driven at a temperature of 450–600° C. for recovery of hydrogen from hydrocarbon, comprising:

a plurality of hydrogen-separating members each having a substrate, which is made of a ferritic stainless steel containing Cr up to 15 mass % and Ti and/or Nb at a ratio not less than (C+N)×8, and perforated with a plurality of gas-permeable holes, coated with a hydrogen-permeating membrane at its outer surface;

a double-pipe having inner and outer walls, between which said membranes are inserted; and a catalyst for decomposition of hydrocarbon gas put in a cavity defined by said inner and outer walls of said double-pipe, wherein hydrocarbon gas is decomposed with combustion heat of a fuel fed to an inner space of said double-pipe, and hydrogen gas as a decomposition product selectively passes through said hydrogen-permeable membranes to an outside.

* * * * *